United States Patent
Ramsdell

(10) Patent No.: US 6,925,715 B2
(45) Date of Patent: Aug. 9, 2005

(54) METHOD FOR SEATING A REMOVABLE BEARING ASSEMBLY IN A ROTARY ACTUATOR ASSEMBLY FOR A ROTATABLE MEDIA DATA STORAGE DEVICE

(75) Inventor: Richard G. Ramsdell, Saratoga, CA (US)

(73) Assignee: Matsushita Electric Industrial Co., Osaka (JP)

( * ) Notice: Subject to any disclaimer, the term of this patent is extended or adjusted under 35 U.S.C. 154(b) by 0 days.

(21) Appl. No.: 10/365,906

(22) Filed: Feb. 13, 2003

(65) Prior Publication Data
US 2004/0123463 A1 Jul. 1, 2004

Related U.S. Application Data
(60) Provisional application No. 60/437,164, filed on Dec. 30, 2002.

(51) Int. Cl.[7] ................................................ G11B 5/55
(52) U.S. Cl. .................. 29/898.07; 29/898.09; 29/426.1; 29/525.11; 360/265.2; 360/265.6; 360/265.9; 360/266.1; 384/281; 384/540
(58) Field of Search ........................ 29/426.1, 525.11, 29/428, 898.07, 898.09; 360/265.2, 265.6; 384/281, 540

(56) References Cited

U.S. PATENT DOCUMENTS

| | | | |
|---|---|---|---|
| 5,034,837 A | 7/1991 | Schmitz | 360/105 |
| 5,235,482 A | 8/1993 | Schmitz | 360/97.02 |
| 5,404,636 A | 4/1995 | Stefansky et al. | 29/603 |
| 5,491,598 A * | 2/1996 | Stricklin et al. | 360/265.6 |
| 5,627,702 A * | 5/1997 | Kelemen et al. | 360/265.6 |
| 5,751,519 A * | 5/1998 | Hata | 360/265.6 |
| 6,185,075 B1 * | 2/2001 | Tsujino et al. | 360/265.7 |
| 6,256,173 B1 * | 7/2001 | Chee et al. | 360/265.7 |
| 6,525,910 B1 * | 2/2003 | Macpherson | 360/265.6 |
| 2003/0043510 A1 | 3/2003 | Miyamoto et al. | |

* cited by examiner

*Primary Examiner*—Eric Compton
(74) *Attorney, Agent, or Firm*—Fliesler Meyer

(57) ABSTRACT

Methods in accordance with the present invention can eliminate cumbersome and potentially contaminating methods for connecting a bearing assembly with an actuator assembly. One such assembly comprises a bearing assembly with a threaded base for insertion into a bore, wherein the bore includes threads for engaging the threaded base of the bearing assembly, eliminating the contamination associated with such methods as glueing. The bearing assembly is designed such that it can be disconnected from the actuator assembly for rework without damaging or contaminating the actuator assembly or bearing assembly. This description is not intended to be a complete description of, or limit the scope of, the invention. Other features, aspects, and objects of the invention can be obtained from a review of the specification, the figures, and the claims.

2 Claims, 5 Drawing Sheets

METHOD FOR SEATING A REMOVABLE BEARING ASSEMBLY IN A ROTARY ACTUATOR ASSEMBLY FOR A ROTATABLE MEDIA DATA STORAGE DEVICE

PRIORITY CLAIM

This application claims priority to the following U.S. Provisional Patent Application:

U.S. Provisional Patent Application No. 60/437,164, entitled "Method for Seating a Removable Bearing Assembly in a Rotary Actuator Assembly for a Rotatable Media Data Storage Device," filed Dec. 30, 2002.

CROSS-REFERENCED CASES

This application incorporates by reference all of the following applications:

U.S. patent application Ser. No.10/365,932, entitled "Rotary Actuator Assembly for a Rotatable Media Data Storage Device," filed Feb. 13, 2003.

U.S. patent application Ser. No. 10/366,235, entitled "Methods for Assembling or Reworking a Rotary Actuator Assembly for a Rotatable Media Data Storage Device," filed Feb. 13, 2003.

U.S. patent application Ser. No. 10/366,074, entitled "Modular Rotary Actuator Assembly for a Rotatable Media Data Storage Device," filed Feb. 13, 2003.

U.S. patent application Ser. No. 10/365,934, entitled "Methods for Assembling or Reworking a Modular Rotary Actuator Assembly for a Rotatable Media Data Storage Device," filed Feb. 13, 2003.

U.S. patent application Ser. No. 10/365,912, entitled "Removable Bearing Assembly in a Rotary Actuator Assembly for a Rotatable Media Data Storage Device," filed Feb. 13, 2003.

FIELD OF THE INVENTION

The present invention relates to actuator assemblies within rotatable media data storage as for example magnetic or optical hard disk drive technology.

BACKGROUND OF THE INVENTION

Computer systems are fundamentally comprised of subsystems for storing and retrieving information, manipulating information, and displaying information. Nearly all computer systems today use optical, magnetic or magneto-optical storage media to store and retrieve the bulk of a computer system's data. Successive generations of ever more powerful microprocessors, and increasingly complex software applications that take advantage of these microprocessors, have driven the storage capacity needs of systems higher and have simultaneously driven read and write performance demands higher. Magnetic storage remains one of the few viable technologies for economically storing large amounts of information with acceptable read and write performance.

Market pressures place ever greater demands on hard disk drive manufacturers to reduce drive costs. To maintain market advantage, new hard disk drive designs typically incorporate greater efficiency in device operating tolerances or manufacturability.

There are basic components common to nearly all hard disk drives. A hard disk drive typically contains one or more disks clamped to a rotating spindle, ahead for reading or writing information to the surface of each disk, and an actuator assembly utilizing linear or rotary motion for positioning the head for retrieving information or writing information to a location on the disk. A rotary actuator is a complex assembly that couples the head to a pivot point that allows the head to sweep across the surface of the rotating disk. The assembly typically couples the head to a flexible member called a suspension, which is then coupled to the pivotally mounted actuator assembly.

The pivoting motion of a rotary actuator is achieved with minimal friction by connecting the actuator assembly with a bearing assembly such that the actuator assembly does not slip relative to the pivoting portion of the bearing assembly. Common methods of connecting an actuator assembly with a bearing assembly are typically cumbersome and risk contamination, or are not suitable for smaller bearing assembly diameters

BRIEF DESCRIPTION OF THE FIGURES

Further details of embodiments of the present invention are explained with the help of the attached drawings in which.

DESCRIPTION

Figure 1A:
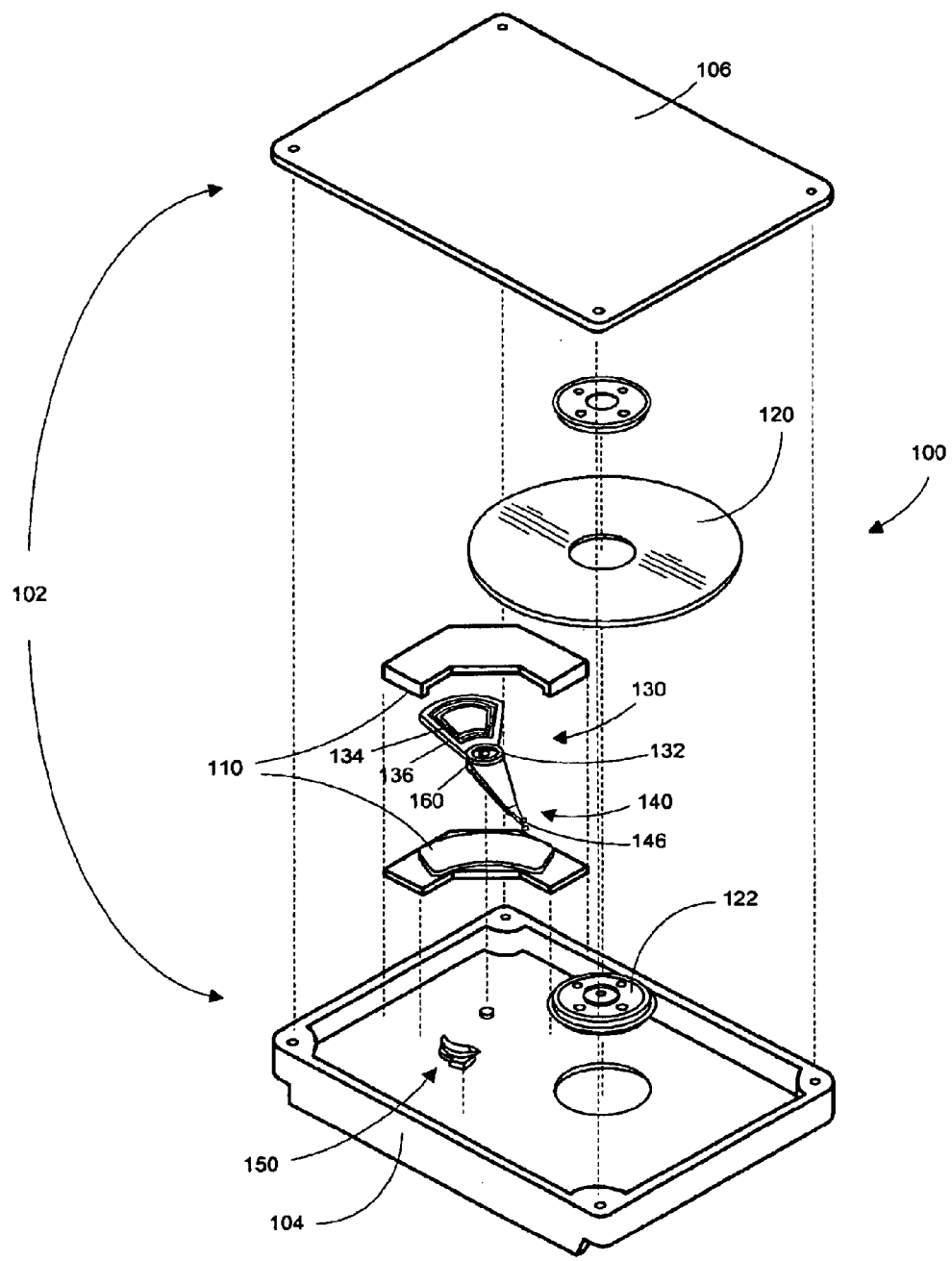
FIG. 1A is an exploded view of a typical hard disk drive utilizing a bearing assembly in accordance with one embodiment of the present invention.

FIG. 1 is an exploded view of a hard disk drive 100 utilizing a bearing assembly in accordance with one embodiment of the present invention. The hard disk drive 100 has a housing 102 which is formed by a housing base 104 and a housing cover 106. A single disk 120 is attached to the hub of a spindle motor 122, with the spindle motor 122 mounted to the housing base 104. The disk 120 can be made of a light aluminum alloy, ceramic/glass or other suitable substrate, with magnetic material deposited on one or both sides of the disk 120. The magnetic layer has tiny domains of magnetization for storing data transferred through heads. The invention described herein is equally applicable to technologies using other media, as for example, optical media. Further, the invention described herein is equally applicable to devices having any number of disks attached to the hub of the spindle motor. The disks are connected to a rotating spindle 122 (for example by clamping), spaced apart to allow the heads 146 to access the surfaces of each disk 120, and rotated in unison at a constant or varying rate typically ranging from less than 3,600 RPM to over 15,000 RPM (speeds of 4,200 and 5,400 RPM are common in hard disk drives designed for mobile devices such as laptops).

Figure 1B:
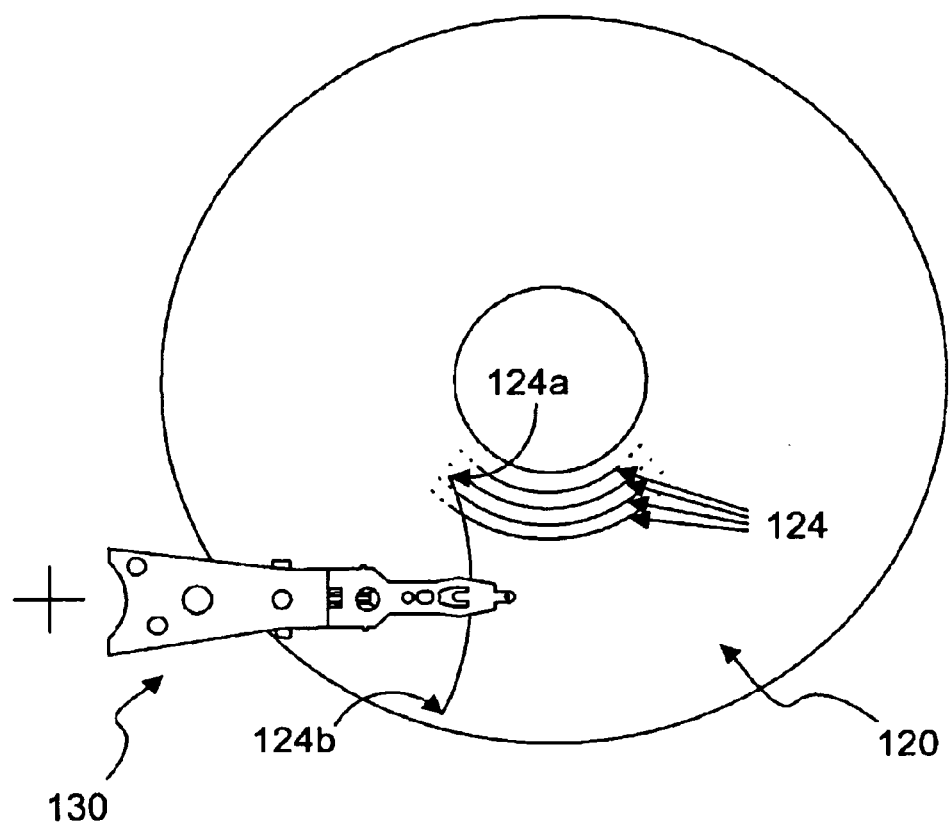
FIG. 1B is an illustration of the rotary motion of an actuator assembly of FIG. 1A across the surface of a disk.

The actuator assembly 130 is pivotally mounted to the housing base 104 by a bearing assembly 160 and sweeps an arc, as shown in FIG. 1B, between the inner diameter of the disk 120a and the outer diameter of the disk 120b. Attached to the housing 104 are upper and lower magnet return plates 110 and at least one magnet that together form the stationary portion of the voice coil motor assembly 112. The voice coil 134 is mounted to the actuator assembly 130 and positioned in the air gap of the voice coil motor 112 which applies a force to the actuator assembly 130 to provide the pivoting motion about the bearing assembly 160. The voice coil motor allows for precise positioning of the heads 146 along the surface of the disk 120. The voice coil motor 112 is coupled with a servo system (not shown) to accurately position the head 146 over a specific track on the disk 120. The servo system acts as a guidance system, using positioning code (for example grey code) read by the head 146 from the disk 120 to determine the position of the head 146 on tracks 124 on the disk 120. The actuator assembly 130 is shown in FIGS. 1 and 2 to have an overall wedge-shape, but could alternatively have a variety of shapes: for example, the actuator assembly could be rectangular or oblong, or shaped like an arrow.

The heads 146 read and/or write data to the disks. Each side of a disk 120 can have an associated head 146, and the heads 146 are collectively coupled to the actuator assembly 130 such that the heads 146 pivot in unison. When not in use, the heads 146 can rest on the stationary disk 120 (typically on an inner portion of the disk that does not contain data) or on a ramp 150 positioned either adjacent to a disk or just over the disk surface.

Figure 2:
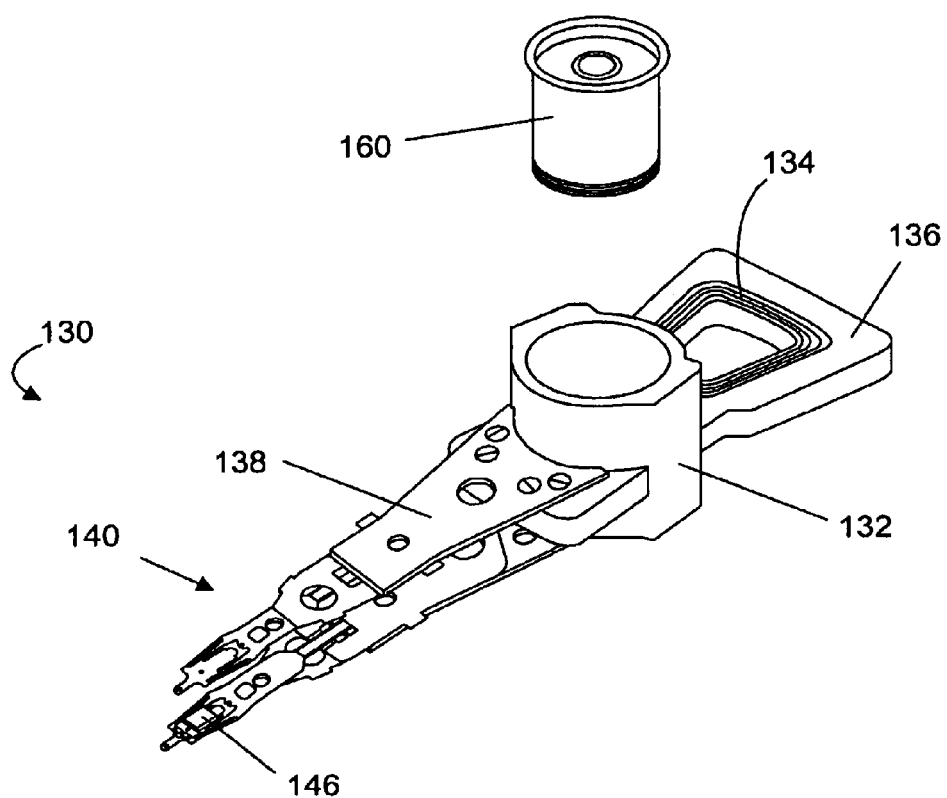
FIG. 2 illustrates the actuator assembly of FIG. 1A with a bearing assembly in accordance with one embodiment of the invention removed.

FIG. 2 illustrates an actuator assembly with a bearing assembly in accordance with the present invention removed from the actuator assembly. The actuator assembly 130 comprises amounting block 132 having a solid bore for receiving the bearing assembly 160. Actuator arms 138 attach to a first end of the mounting block 132. Each actuator arm 138 can be attached with screws or adhesive, for example, or can be cast or extruded as part of the mounting block 132. In other embodiments the actuator arm 138 can be an actuator arm plate that includes a circular bore, that when coupled to spacer elements, forms a cylindrical bore designed to receive the bearing assembly 160. A head suspension assembly 140 is connected with each arm 138, typically by spot-welding or ball swaging. A voice coil holder 136 is mounted at a second end of the mounting block 132, and retains a voice coil 134. The voice coil holder 136 maybe cast as part of a singular block element with the mounting block 132, adhesively bonded or plastic over-molded onto the mounting block 132. One of ordinary skill in the art can appreciate the different methods for fastening the voice coil holder 136 to the mounting block 132.

The bearing assembly 160 can be connected with the actuator assembly 130 using one of a number of different methods, including: gluing the bearing assembly 160 to the walls of the bore of the mounting block 132, holding the bearing assembly 160 in position with a snap-ring, attaching the bearing assembly 160 to the bore with a set screw inserted through a hole in the side of the mounting block 132, or press-fitting the bearing assembly 160 into the bore. Each of these methods has its own associated problems. Gluing the bearing assembly 160 to the walls of the bore is cumbersome, can cause contamination in the hard disk drive and complicates disassembly for rework. Press-fitting the bearing assembly 160 into the bore similarly complicates disassembly for rework. Attaching the bearing assembly 160 to the bore using a snap-ring is cumbersome as well. Fixing the bearing assembly 160 to the bore using a set screw requires sufficient material in both the barrel of the cartridge and the side of the mounting block 132 to support the screw torque. Snap-rings and set screws are not suitable methods of connecting a bearing assembly 160 with a mounting block 132 for smaller hard disk drive form factors. Similarly, gluing and press-fitting are not suitable methods of connecting a bearing assembly 160 with amounting block 132 where proper cleaning and actuator assembly rework are desired.

Figure 3:
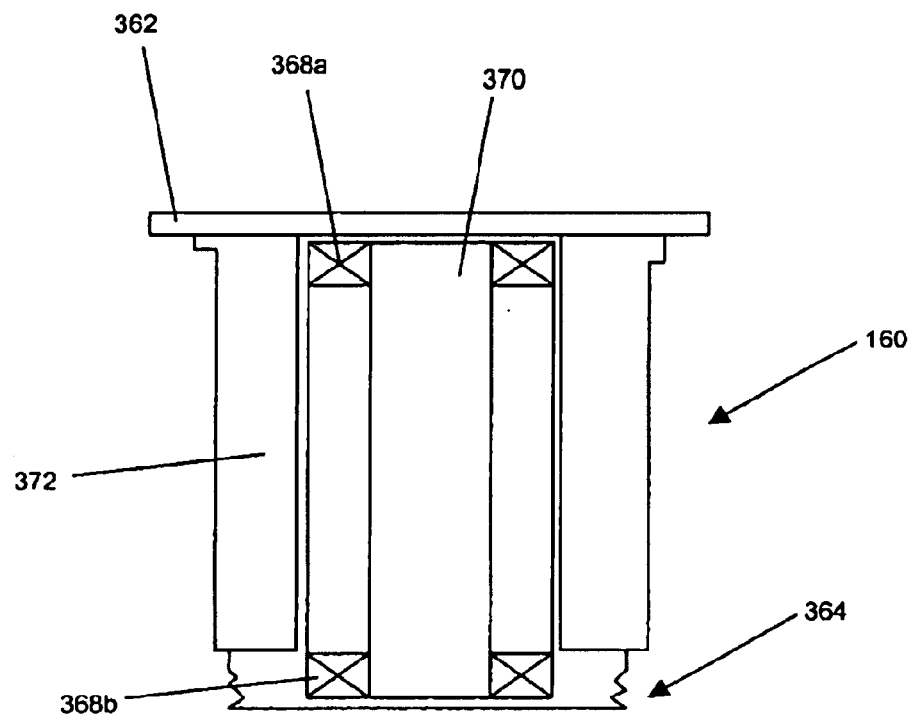
FIG. 3 is a cross-sectional view of a portion of the actuator assembly and the bearing assembly of FIG. 2.
Figure 3:
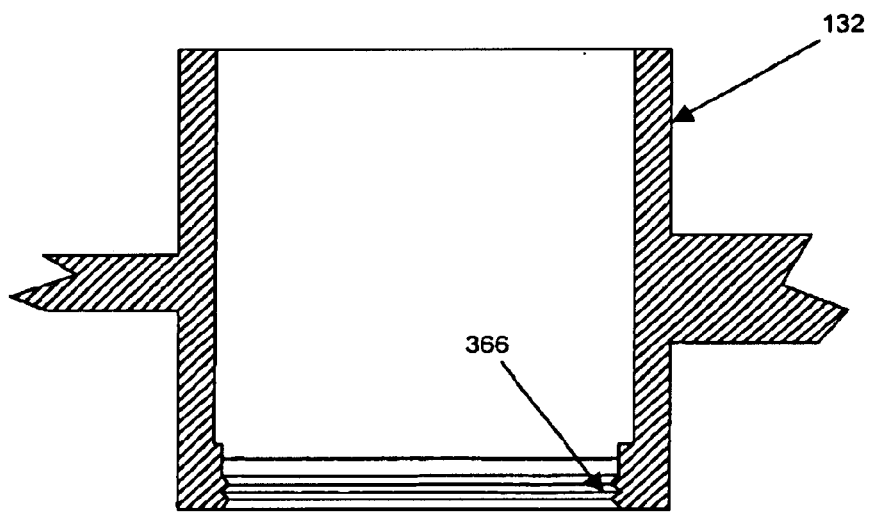
Figure 4:
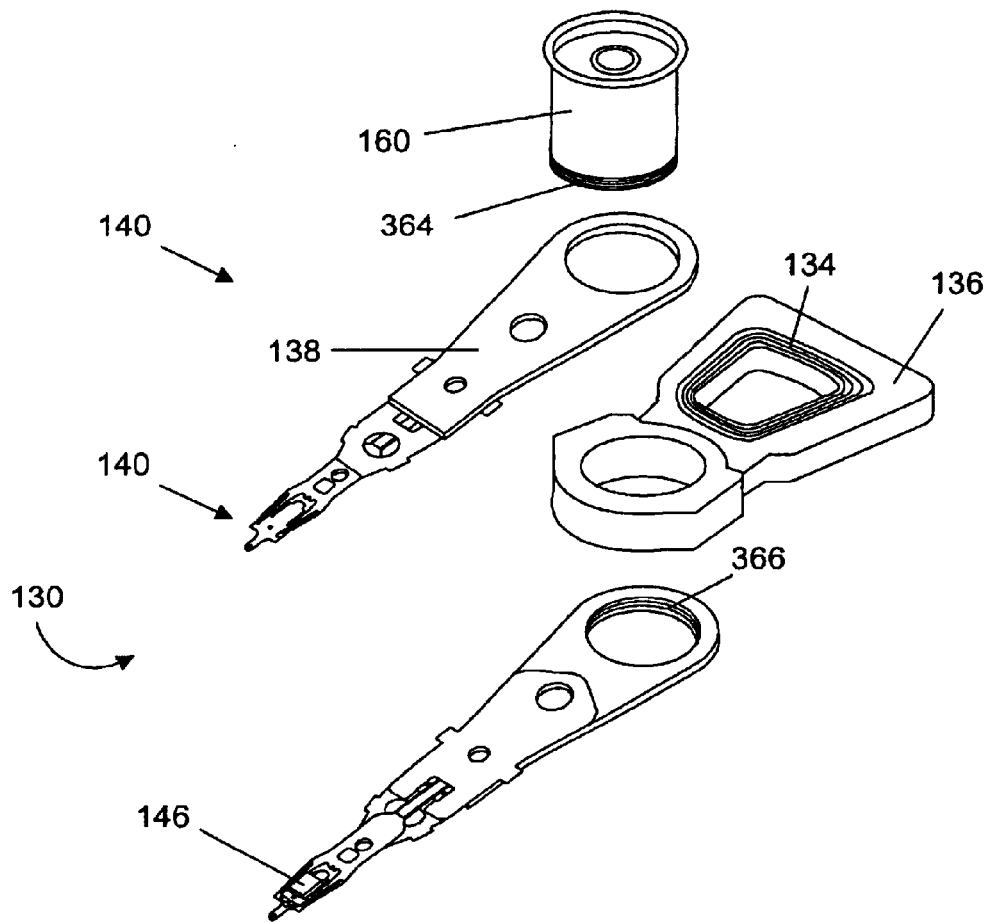
FIG. 4 is an exploded view of an actuator assembly comprised of arm plates and a bearing assembly in accordance with one embodiment of the invention.

As shown in FIG. 2, a bearing assembly 160 in accordance with one embodiment of the present invention has a threaded base 364 and seating flange 362. FIG. 3 shows a cross-section of the bearing assembly 160 and mounting block 132. The mounting block 132 includes a threaded bore 366 for receiving the threaded base 364 of the bearing assembly 160. The mounting block 132 is shown to be a single cast or extruded piece with a solid bore, but alternatively can be machined or comprised of multiple pieces. For example, the mounting block 132 can include a cylindrical bore comprised of arm plates each with a circular bore (as described above and shown in FIG. 4), with at least one arm plate including threads 366 for receiving the threaded base 364 of the bearing assembly 160.

As shown in FIG. 3, the bearing assembly 160 can be a cartridge bearing having two sets of ball-bearings 368 between concentric cylinders—one set of ball-bearings 368*b* near the base of the bearing assembly and one set of ball-bearings 368*a* near the top of the bearing assembly. The outer cylinder 372 rotates relatively freely about the inner cylinder 370. The bearing assembly 160 can be connected with a housing 104 by a rod (not shown) attached to the housing 104 and inserted within the inner cylinder 370. In other embodiments the bearing assembly 160 may have more than two sets of ball-bearings 368, or may have one or more sets of roller bearings. In still other embodiments the bearing assembly 160 may use fluid-dynamic bearings.

The bearing assembly 160 can also include a seating flange 362 for seating and unseating the bearing assembly 160 in the bore of the mounting block 132. In one embodiment the seating flange 362 is circular, while in other embodiments the seating flange 362 includes a wrenching flat. In still other embodiments the bearing assembly 160 does not have a seating flange 362.

The invention described herein is equally applicable to technologies using other read/write devices and other data storage media. For example, a bearing assembly 160 in accordance with the embodiments described herein could be used with a rotary actuator connected with a laser or an atomic probe for writing to a polycrystalline silicon substrate. The invention described herein is equally applicable to unrelated technologies using bearing assemblies. The description and illustrations provided are not intended to limit the invention to data storage technology.

Methods are also provided for seating a bearing assembly 160 in accordance with embodiments of the present invention. In one such method, the bearing assembly 160 is inserted into the bore of a mounting block 132 of the actuator assembly until threads 364 of the bearing assembly 160 contact threads 366 within the bore. The bearing assembly 160 is rotated such that the threads 364 of the bearing assembly 160 engage the threads 366 of the bore until the bearing assembly 160 is seated within the bore. In other embodiments, the bearing assembly 160 has a wrenching flat for more easily applying torque or rotating the bearing assembly 160.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A method to assemble an actuator assembly that can access a rotatable data storage medium, comprising:

proving a voice coil holder, a bearing assembly having a seating flange with a wrenching flat at a first end and a screw thread at a second end, and a plurality of arm plates having a bore, at least one of the plurality of arm plates having threads within the respective bore;

arranging the plurality of arm plates such that the corresponding bores are substantially aligned;

arranging the plurality of arm plates such that the at least one arm plate is positioned farthest from a point of insertion of the bearing assembly within the bore;

inserting the bearing assembly into the aligned bores;

engaging the screw thread of the bearing assembly with the threads of the at least one arm plate; and rotating the bearing assembly to seat the bearing assembly in the bore;

wherein the bearing assembly is rotated by engaging the wrenching flat of the seating flange; and wherein the actuator assembly is provided with sufficient rigidity when the bearing assembly is seated within the bore such that the actuator assembly can access the data storage medium.

2. A method to disassemble an actuator assembly, comprising:

providing an actuator assembly including a voice coil holder, a bearing assembly having a seating flange with a wrenching flat at a first end and a screw thread at a second end, and a plurality of arm plates having a bore, at least one of the plurality of arm plates having threads within the respective bore, wherein the bearing assembly is seated in the bore such that the screw thread of the bearing assembly engages the threads of the at least one arm plate;

engaging the wrenching flat of the seating flange;

rotating the bearing assembly to unseat the bearing assembly in the bore;

disengaging the screw thread of the bearing assembly from the threads of the at least one arm plate;

removing the bearing assembly from the bore; and disassociating the plurality of arm plates.

* * * * *